US009434005B2

(12) United States Patent
Yokota et al.

(10) Patent No.: US 9,434,005 B2
(45) Date of Patent: Sep. 6, 2016

(54) PB-FREE COPPER-ALLOY SLIDING MATERIAL, AND PLAIN BEARING

(75) Inventors: Hiromi Yokota, Aichi (JP); Ryo Mukai, Aichi (JP); Shinichi Kato, Aichi (JP); Nahomi Hamaguchi, Aichi (JP)

(73) Assignee: Taiho Kogyo Co., Ltd., Toyota-Shi (JP)

( * ) Notice: Subject to any disclaimer, the term of this patent is extended or adjusted under 35 U.S.C. 154(b) by 1079 days.

(21) Appl. No.: 13/493,617

(22) Filed: Jun. 11, 2012

(65) Prior Publication Data

US 2012/0251375 A1 Oct. 4, 2012

Related U.S. Application Data

(63) Continuation of application No. 12/600,178, filed as application No. PCT/JP2008/058851 on May 14, 2008, now abandoned.

(30) Foreign Application Priority Data

May 15, 2007 (JP) .................. 2007-129615

(51) Int. Cl.
B22F 7/08 (2006.01)
C22C 1/04 (2006.01)
C22C 9/00 (2006.01)
C22C 9/02 (2006.01)
(Continued)

(52) U.S. Cl.
CPC ............. *B22F 7/08* (2013.01); *C22C 1/0425* (2013.01); *C22C 9/00* (2013.01); *C22C 9/02* (2013.01); *C22C 9/04* (2013.01); *C22C 9/08* (2013.01); *F16C 33/121* (2013.01); *B22F 2998/00* (2013.01); *F16C 2204/12* (2013.01); *Y02T 10/865* (2013.01)

(58) Field of Classification Search
CPC .... B22F 7/08; F16C 33/121; F16C 2204/12; C22C 9/00; C22C 9/02; C22C 9/04; C22C 9/08; C22C 1/0425; Y02T 10/865
See application file for complete search history.

(56) References Cited

U.S. PATENT DOCUMENTS 4,551,395 A 11/1985 Lloyd
5,489,487 A 2/1996 Tanaka et al.
(Continued)

FOREIGN PATENT DOCUMENTS

GB 2355016 A 4/2001
JP 61-73849 A 4/1986
(Continued)

OTHER PUBLICATIONS

"Development of Sulfuring-resistant Bearing Material," Pre-lecture Paper of Tribology Conference of Tribology Institute of Japan, May 2003.
(Continued)

*Primary Examiner* — Matthew E Hoban
*Assistant Examiner* — John Hevey
(74) *Attorney, Agent, or Firm* — Birch, Stewart, Kolasch & Birch, LLP

(57) ABSTRACT

A method of producing a Pb-free copper-alloy sliding material containing 1.0 to 15.0% of Sn, 0.5 to 15.0% of Bi and 0.05 to 5.0% of Ag, and Ag and Bi from an Ag—Bi eutectic. If necessary, at least one of 0.1 to 5.0% of Ni, 0.02 to 0.2% P, 0.5 to 30.0% of Zn, and 1.0 to 10.0 mass % of at least one of a group consisting of $Fe_3P$, $Fe_2P$, FeB, NiB and AlN may be added.

9 Claims, 4 Drawing Sheets

METAL MICROSCOPE PHOTOGRAPH × 200

(51) Int. Cl.
*F16C 33/12* (2006.01)
*C22C 9/04* (2006.01)
*C22C 9/08* (2006.01)

(56) References Cited

U.S. PATENT DOCUMENTS

| | | | |
|---|---|---|---|
| 6,025,081 A * | 2/2000 | Ohshiro | B32B 15/01 384/912 |
| 6,254,701 B1 | 7/2001 | Oshiro et al. | |
| 6,652,675 B2 | 11/2003 | Sakai et al. | |
| 2001/0019779 A1 | 9/2001 | Sakai et al. | |
| 2003/0064239 A1 | 4/2003 | Saitou et al. | |
| 2006/0000527 A1 | 1/2006 | Yokota et al. | |
| 2007/0042218 A1 | 2/2007 | Lang et al. | |
| 2008/0095658 A1 | 4/2008 | Yokota et al. | |

FOREIGN PATENT DOCUMENTS

| | | |
|---|---|---|
| JP | 3-247732 A | 11/1991 |
| JP | 4-28802 A | 1/1992 |
| JP | 4-28836 A | 1/1992 |
| JP | 7-9046 B2 | 2/1995 |
| JP | 7-179964 A | 7/1995 |
| JP | 8-19945 B2 | 3/1996 |
| JP | 10-46272 A | 2/1998 |
| JP | 10-330868 A | 12/1998 |
| JP | 3108363 B2 | 11/2000 |
| JP | 2001-81523 A | 3/2001 |
| JP | 2001-107106 A | 4/2001 |
| JP | 2001-220630 A | 8/2001 |
| JP | 2001-240925 A | 9/2001 |
| JP | 2002-12902 A | 1/2002 |
| JP | 2002-60869 A | 2/2002 |
| JP | 3421724 B2 | 6/2003 |
| JP | 3560723 B2 | 9/2004 |
| JP | 2005-163074 A | 6/2005 |
| JP | 2005-200703 A | 7/2005 |
| JP | 2005-350722 A | 12/2005 |
| JP | 2006-37180 A | 2/2006 |
| JP | 2006-200024 A | 8/2006 |
| WO | WO 2005/033353 A2 | 4/2005 |

OTHER PUBLICATIONS

Advisory Action dated Jul. 27, 2009 in U.S. Appl. No. 11/148,186.
Advisory Action dated Nov. 6, 2007 in U.S. Appl. No. 11/148,186.
European Search Report dated Apr. 18, 2007 in European Application No. 05703541.2.
European Search Report in European Application No. 08013143.6, dated Oct. 20, 2008.
Final Rejection dated Dec. 9, 2011 in U.S. Appl. No. 12/600,178.
Final Rejection dated Feb. 3, 2009 in U.S. Appl. No. 10/585,993.
Final Rejection dated Mar. 9, 2009 in U.S. Appl. No. 11/148,186.
Final Rejection dated May 7, 2007 in U.S. Appl. No. 11/148,186.
International Preliminary Report on Patentability dated Feb. 19, 2009 in International Application No. PCT/JP2007/065125.
International Preliminary Report on Patentability dated Oct. 8, 2009 in International Application No. PCT/JP2008/054524.
International Preliminary Report on Patentability dated Sep. 10, 2010 in Application No. PCT/JP2009/050995.
International Search Report dated Mar. 18, 2008 for Application No. PCT/JP2008/052320.
International Search Report dated May 17, 2005 in International Application No. PCT/JP2005/000302.
International Search Report in International Application No. PCT/JP2008/054524, dated Apr. 15, 2008.
Interview Summary dated Aug. 13, 2009 in U.S. Appl. No. 11/148,186.
Interview Summary dated Jun. 17, 2008 in U.S. Appl. No. 11/148,186.
Interview Summary dated Jun. 5, 2008 in U.S. Appl. No. 11/148,186.
Interview Summary dated Oct. 9, 2009 in U.S. Appl. No. 10/585,993.
Non-final Rejection dated Apr. 1, 2010 in U.S. Appl. No. 11/148,186.
Non-Final Rejection dated Apr. 5, 2011 for U.S. Appl. No. 12/600,178.
Non-final Rejection dated Aug. 19, 2008 in U.S. Appl. No. 11/148,186.
Non-final Rejection dated Jun. 30, 2008 in U.S. Appl. No. 10/585,993.
Non-final Rejection dated Oct. 10, 2006 in U.S. Appl. No. 11/148,186.
Non-Responsive Office Action dated May 5, 2008 in U.S. Appl. No. 11/148,186.
Notice of Allowance dated Oct. 15, 2010 in U.S. Appl. No. 11/148,186.
Notice of Allowance dated Oct. 21, 2009 in U.S. Appl. No. 10/585,993.
Rabinowicz, Ernest, "Friction and Wear of Materials", Second Edition, pp. 32, 33, 38 & 39, 1995.
Response to Interview Summary dated Jun. 17, 2008 in U.S. Appl. No. 11/148,186.
Written Opinion dated Jul. 1, 2008, issued in International Application No. PCT/JP2008/058851.

* cited by examiner

METAL MICROSCOPE PHOTOGRAPH × 200

PB-FREE COPPER-ALLOY SLIDING MATERIAL, AND PLAIN BEARING

This application is a Continuation of U.S. patent application Ser. No. 12/600,178, filed Jun. 28, 2010, which is the U.S. National Phase of PCT/JP2008/058851, filed May 14, 2008 now abandoned. Priority is claimed thereto under 35 U.S.C. §120. This application also claims priority under 35 U.S.C. §119(a) to Japanese patent application No. 2007-129615, filed in Japan on May 15, 2007. The entire contents of all are herein incorporated by reference.

TECHNICAL FIELD

The present invention relates to a Pb-free copper-alloy sliding material. More particularly, the present invention relates to a Cu—Sn—Bi based sliding material and a plain bearing.

BACKGROUND TECHNIQUE

A Cu—Sn—Pb based alloy for casting is standardized in JISH2207. A Cu—Sn—Pb based sintered alloy having the same composition as JISH2207 is bonded to a backing metal. The resultant bimetal bearing is used for a bush of an automatic transmission, such as a sun gear, an oil pump, a transfer, an end bearing, and a pinion. Pb is dispersed to form a low-melting secondary-phase in such copper alloy and behaves as a lubricating component. Pb also reduces hardness of copper-alloy as a whole and improves conformability. As a result, the seizure resistance of the copper alloy is improved.

Patent Document 1: Japanese Unexamined Patent Publication (kokai) No. 2001-107106 proposes a bimetal bearing of sintered copper-alloy. This copper alloy contains 0.4% or less P and 12% or less Sn by weight percentage as essential elements, and further contains 10% or less Ni, 5% or less Ag, 5% or less Pb and 5% or less Bi as optional components. Mo and/or W are dispersed in the sintered copper alloy as hard particles. Patent Document 1 describes that Bi and Pb improve conformability; and, Ag enhances corrosion resistance and strength. This effect is realized as long as Ag is dissolved in solid copper (Cu).

Patent Document 2: Japanese Unexamined Patent Publication (kokai) No. 2005-350722 relates to a Pb-free Cu—Bi-hard-particle-based sintered alloy and proposes to refine the Bi-phase particles by means of the hard-particles so as to achieve sliding properties equivalent to the Pb-containing copper alloy.

Patent Document 3: Japanese Patent No. 3560723 (Japanese Patent Application Hei 8-57874) proposes a plain-bearing copper-alloy which is Pb free. Ag, Sn, Sb, In, Mn, Fe, Bi, Zn, Ni and/or Cr (except for combination of only Ag and Sn) is dissolved in the solid Cu matrix. In particular, Ag is solid-dissolved in a non-equilibrium state. No secondary phase of these elements is essentially formed. A soft secondary phase, such as Pb, is absent in the copper alloy, and therefore such alloy is called Pb free. According to the description of Patent Document 3, the specified solute elements, for example, Ag and Bi, concentrate on the surface of copper alloy during sliding and form an excellent seizure-resistant material. The properties of the copper alloy are equivalent to those of a Pb-containing copper alloy.

From a binary Cu—Bi phase diagram, solid Cu and solid Bi have essentially no solubility with each other. Cu and Bi are mutually dissolved in a liquid phase and form two separate solid phases. Therefore, in order to dissolve Bi in the solid copper-alloy, Cu and Bi in molten state must be extremely rapidly cooled to produce a melt-quenched Cu—Bi powder. However, the cooling rate is higher than an industrially possible one.

Patent Document 1: Japanese Unexamined Patent Publication (kokai) No. 2001-107106
Patent Document 2: Japanese Unexamined Patent Publication (kokai) No. 2005-350722
Patent Document 3: Japanese Patent No. 3560723

DISCLOSURE OF INVENTION

Problems to be Solved by Invention

Although Patent Document 1 does not specifically intend to provide a Pb-free alloy, when not Pb but Bi is selected among the optional elements, a Pb-free Cu—Bi composition is provided. Patent Document 1 does not specifically describe at all inferior conformability of Bi to that of Pb.

Bi soft secondary phases are dispersed in the Pb-free Cu—Bi based alloy proposed in Patent Document 2. Since Bi has a friction coefficient higher than that of Pb, sliding properties of the copper alloy proposed in patent Document 2 at high temperature are difficult to attain the level of Pb-containing Cu—Sn based alloy. Patent Document 2 attempts to solve this problem by refining the Bi phase, although Bi phase is desirably somewhat coarse from a viewpoint of conformability.

Meanwhile, sliding properties of the Pb-free Cu—Bi—Ag based alloy proposed in Patent Document 3 remain stable after the alloy undergoes considerable amounts of sliding. Since the soft secondary phases are not yet formed in parts directly after production and being used as sliding parts, friction coefficient is detrimentally high during the initial sliding period.

It is, therefore, an object of the present invention to provide a Pb-free copper-alloy sliding material and a plain bearing, which has seizure resistance equivalent to that of Cu—Pb based alloy and has a stable friction coefficient from the initial sliding period.

Means for Solving the Problem

A Pb-free copper-alloy sliding material according to the present invention contains, by mass percentage, 1.0 to 15.0% of Sn, 0.5 to 15.0% of Bi and 0.05 to 5.0% of Ag, with the balance being Cu and unavoidable impurities, and is characterized in that the Ag and Bi form an Ag—Bi eutectic. The present invention is hereinafter described in detail.

Alloy Composition

First, a composition of the copper alloy according to the present invention is described.

Sn is a component of the copper alloy, and improves its strength and corrosion resistance against a corrosive component contained in lubricant oil or the like, particularly S-containing organic compound. These effects are slight, when the Sn content is less than 1.0% (the percentage is mass % unless otherwise specified). On the other hand, when the Sn content exceeds 15.0%, a Cu—Sn based intermetallic compound is formed. The copper alloy thus embrittles and seizure resistance is impaired. The Sn content is preferably 2.0 to 10.0%, more particularly 2.0 to 6.0%.

Bi reduces hardness of the copper alloy as a whole and improves conformability. Bi also suppresses adhesion of Cu to the mating shaft and thus improves enhances seizure resistance. These effects are slight, when the Bi content is less than 0.5%. On the other hand, when the Bi content exceeds 15.0%, strength of the copper alloy and hence wear resistance are lowered. The Bi content is preferably 2.0 to 10.0%, more preferably 3.0 to 8.0%.

Ag and Bi form an eutectic, so that Bi brings about the low adhesion mentioned above. These effects are slight, when the Ag content is less than 0.05%. On the other hand, when the Ag content is more than 5.0%, strength and hence wear-resistance of the copper alloy is lowered. The Ag content is preferably 0.1 to 0.2%. Balance of the above components is Cu and inevitable impurities. In particular, Pb is in a trace amount or even lower.

A copper alloy according to the present invention can contain an optional component(s), which is at least one element of 0.1 to 5.0% Ni, 0.02 to 0.2% P and 0.5 to 30.0% Zn.

Ni improves the strength of copper alloy and corrosion resistance against lubricant oil or the like. These effects are slight, when the Ni content is less than 0.1%. When the Ni content exceeds 5.0%, non-adhesion to the mating material is impaired. A preferable Ni content is from 0.5 to 2.0%.

P is a component which forms liquid phase during sintering and improves bonding to a backing metal and material strength. These effects are slight, when the P content is less than 0.02%, whereas when the P content exceeds 0.2%, the material seriously embrittles due to formation of a Cu—P compound.

Zn is a component which enhances corrosion resistance against lubricant oil. This effect is slight, when the Zn content is less than 0.5%, whereas when the Zn content exceeds 30.0%, the material strength lowers, thereby lowering seizure resistance and wear resistance. The Zn content is preferably 1.0 to 30.0%, more preferably 15.0 to 20.0%.

In addition, hard particles can be added to the copper alloy according to the present invention to thereby provide a composite material. The hard particles improve wear resistance of copper alloy against abrasive wear, and thus suppress seizure. The hard particles which can be added to the copper alloy are at least one member of a group consisting of $Fe_3P$, $Fe_2P$, FeB, NiB and AlN having an average particle diameter of 1.5 to 70 μm, and are added in an amount of 1.0 to 10.0% by mass percentage. Among the mentioned hard particles, $Fe_3P$, in particular, which is low in hardness among the hard particles, do not lower machinability. Their abrasion property exerted on a mating shaft is low. In addition, their sinterability with copper alloy is excellent.

When the average particle diameter of hard particles is less than 1.5 μm, they are included in the Ag—Bi eutectic and are liable to separate from the surface of copper alloy during sliding. On the other hand, when the average particle diameter of hard particles exceeds 70 pin, the so-called abrasion property (that is, the hard particles wear off the mating shaft) become serious, which in turn, the surface the mating shaft becomes rough. The copper alloy is worn off by the mating shaft, which means that the sliding properties of copper alloy deteriorate. The hard particles have an average particle size of preferably 10 to 50 μM, more preferably 15 to 40 μm. When the added amount of hard particles is less them 1.0%, their effect is slight. On the other hand, when the added amount of hard particles exceeds 10.0%, the mating-shaft abrasion property mentioned above becomes serious. Material strength lowers and boding property with base metal lowers, as well.

Alloy Structure

The structural constituent elements of copper alloy according to the present invention are basically the Cu matrix and an Ag—Bi eutectic, and also optional components and hard particles in a case where they are present.

More specifically, when the hard particles are added, these particles are dispersed as they are and serve as a structural constituent element(s). Nevertheless, Cu matrix and Ag—Bi eutectic are necessarily formed. When the Cu matrix is subjected to X-ray diffractometry, diffraction peaks of Cu crystals are detected. When the Cu matrix is subjected to microscopic observation, it is distinguished from the Ag—Bi eutectic, which is a secondary phase.

The Ag—Bi eutectic has such morphology that Ag is finely dispersed in the Bi phase elongating along the grain boundaries of Cu matrix. This eutectic belongs to a rod-like eutectic. Trace amounts of Cu and P are present in the Ag—Bi eutectic.

In the Cu—Sn—Bi—Ag based fundamental composition according to the present invention, the Cu matrix is formed of Cu and Sn. Preferably, neither Bi nor Ag is essentially dissolved in the Cu matrix, and, neither Bi nor Ag essentially forms a secondary phase except for the Ag—Bi eutectic. The solute Bi in Cu matrix virtually does not improve the sliding properties. When Bi is present not in the form of eutectic but a single phase, Bi has disadvantageously poor conformability to that of Pb.

Ag in the eutectic morphology contributes to sliding properties as well.

Meanwhile, Sn is mainly dissolved in solid Cu. The term "essentially not dissolved" means that no appreciable intensity of Ag and Bi is present in the Cu matrix by means of the EPMA analysis combined with image analysis described hereinbelow.

In addition, the term "essentially does not form a secondary phase" means that no secondary phase is detected under X-ray diffraction conditions described in Patent Document 3 (Paragraph 0045) (Cu tube, 30 kV, 150 mA).

Optional components may be included in addition to the fundamental components of the present invention. In this case, the Cu matrix consists of Cu and Sn, as well as Ni, P and/or Zn. Preferably, neither Bi nor Ag is essentially dissolved in the Cu matrix and form a secondary phase except for the Ag—Bi eutectic. Ni, P and Zn are constituent components of the Cu matrix and exhibit the performances described hereinabove. Specifically, these components do not form such a structure to impede formation of an Ag—Bi eutectic but are constituent components of the Cu matrix. Also in this case, neither Ag nor Bi is preferably essentially dissolved in the Cu matrix as well as in the case of the basic components.

Production Method

When a solid copper-alloy, in which Sn, Bi and Ag are dissolved, is cooled at a certain cooling rate in the vicinity of 262° C., which is the eutectic temperature in an Ag—Bi binary phase diagram, the Ag—Bi eutectic is formed. That is, when the cooling rate in the vicinity of eutectic temperature is super-high, the eutectic reaction does not occur, but Ag and Bi are forcedly dissolved in the Cu matrix. A single Bi phase elongates in a network form along the Cu matrix interface (crystal grain-boundaries) in a Cu—Bi alloy. When the Ag—Bi eutectic is formed, the single Bi phase seen in the Cu—Bi alloy disappears. The Ag—Bi eutectic is formed in the Cu matrix interface. That is, addition of Ag completely differentiates the Bi-phase morphology in the copper alloy.

The above described phenomena are utilized in the method for producing a Pb-free copper-alloy plain-bearing according to the present invention. This method is characterized in that the starting material powder having a composition described hereinabove is sprayed on a backing metal in the form of a steel sheet, and is sintered at 700 to 900 degrees C. The sintering process is repeated twice, while a forming process to diminish sintering pores is carried out between the preceding and succeeding processes.

In the present invention, copper-alloy powder which contains all of the essential and optional elements is blended by a blender or the like. Alternatively, a predetermined composition may be provided by mixing powders containing several of the above mentioned elements. The powder mixture is blended by a blender or the like. Particle diameter of the powder is not particularly limited but is preferably 180 μm or less. The so-prepared alloy-powder mixture is sprayed on a backing metal, sintered, and is then rolled or pressed to diminish the sintered pores. Re-sintering is carried out under the same conditions. Sintering temperature falls in a range of 700 to 900 degrees C. In a case of adding hard particles, the hard particles are mixed with the alloy powder or powder mixture.

A sintered compact is worked into a cylindrical form to provide a bearing (bush).

BEST MODE FOR CARRYING OUT THE INVENTION

Figure 1:
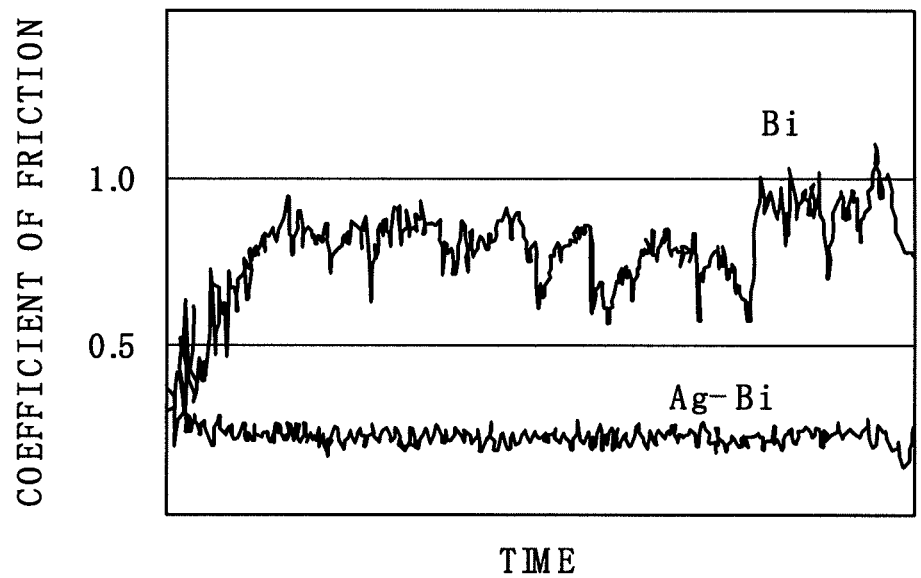
FIG. 1 A graph showing change of friction coefficient

An atomized powder having a diameter of 180 μm or less was based on Cu component-Bi—Ag. Hard particles had an average particle diameter of 1.5 to 70 μm. The atomized powder and hard particles were uniformly blended by a V blender to provide a composition shown in Table 1. The mixed powder was sprayed on a steel sheet to a thickness of approximately 1 mm. Primary sintering, rolling and secondary sintering were carried out. The copper alloy was firmly bonded to the steel sheet and the bimetal was thus provided. The conditions for primary and secondary sintering were as follows: 700 to 900 degree C.; 5 to 30 minutes of sintering time; and 200 degrees C. per minute of cooling rate in the vicinity of the eutectic temperature. The above-mentioned bimetal was formed into a cylindrical form to provide a bearing (bush).

A bearing member prepared as described above was subjected to the following test.

Friction Test

When friction coefficient was measured for a copper alloy, in which Ag—Bi eutectic was finely dispersed, and for a copper alloy, in which a single Bi phase was dispersed, the friction coefficient was low and stable at 25 degrees C. for both copper alloys. Therefore, a friction coefficient was measured at high temperature under the following conditions.

Tester: sticking sliding tester
Temperature of Specimen: 120 degrees C.
Lubrication: no lubrication
Sliding Speed: 0.3 mm/s In the present friction test, lubrication oil was not used and no lubrication condition was employed to provide severe sliding conditions. Temperature of a specimen was measured by a K thermo couple. The measurement results are shown in the right end column of Table 1.

In addition, Examples 2, 4, 8, 11 and Comparative Example 7 of Table 1 were subjected a seizure test of bush shape under the following conditions. The test results are shown in Table 2.

Testing Method of Seizure
Tester: bush journal tester
Mating shaft: SCM415
Circumferential speed: 15 m/s
Load: 1 MPa stepwise increase
Lubrication: ATF (Automatic Transmission Fluid)
Oil temperature: 120 degrees C.

TABLE 1

| Test Group | No. | Components (mass %) | | | Hard Particles | | Maximum Friction Coefficient |
|---|---|---|---|---|---|---|---|
| | | Bi | Ag | Cu Component | Species | Amount | |
| * | 1 | 3.0 | 0.1 | Cu—3Sn | — | — | 0.15 |
| | 2 | 5.0 | 0.1 | Cu—3Sn | Fe$_3$P | 3.0 | 0.12 |
| | 3 | 2.0 | 1.0 | Cu—5Sn | FeB | 5.0 | 0.13 |
| | 4 | 8.0 | 0.2 | Cu—5Sn | Fe$_3$P | 3.0 | 0.12 |
| | 5 | 10.0 | 0.5 | Cu—5Sn | — | — | 0.14 |
| | 6 | 15.0 | 1.0 | Cu—5Sn | Fe$_2$B | 3.0 | 0.13 |
| | 7 | 5.0 | 0.2 | Cu—5Sn— | NiB | 3.0 | 0.13 |
| | 8 | 5.0 | 0.5 | Cu—5Sn—1Ni | — | — | 0.15 |
| | 9 | 5.0 | 0.1 | Cu—6Sn—5Ni | AlN | 1.0 | 0.16 |
| | 10 | 5.0 | 0.2 | Cu—6Sn—0.2P | — | — | 0.18 |
| | 11 | 8.0 | 0.5 | Cu—10Sn | Fe$_3$P | 3.0 | 0.12 |
| | 12 | 8.0 | 0.2 | Cu—10Sn—2Ni | — | — | 0.15 |
| ++ | 1 | 3.0 | — | Cu—3Sn | — | — | 0.23 |
| | 2 | 5.0 | — | Cu—5Sn—1Ni | — | — | 0.28 |
| | 3 | 5.0 | — | Cu—6Sn—0.2P | — | — | 0.25 |
| | 4 | 8.0 | — | Cu—10Sn | — | — | 0.28 |
| | 5 | 8.0 | — | Cu—20Zn | — | — | 0.27 |
| | 6 | 3.0 | 0.1 | Cu—3Sn | — | — | 0.18 |
| | 7 | — | — | Cu—10Sn—10Pb | — | — | 0.20 |

Remarks:
* Examples.
++ Comparative Examples

TABLE 2

| Test Group | No. | Components (mass %) | | | Hard Particles | | Seizure Surface Pressure MPa |
|---|---|---|---|---|---|---|---|
| | | Bi | Ag | Cu Component | Kind | Amount | |
| * | 2 | 5.0 | 0.1 | Cu—3Sn | $Fe_3P$ | 3.0 | 14 |
| | 4 | 8.0 | 0.2 | Cu—5Sn | $Fe_3P$ | 3.0 | 18 |
| | 8 | 5.0 | 0.5 | Cu—5Sn—1Ni | — | — | 14 |
| | 11 | 8.0 | 0.5 | Cu—10Sn | $Fe_3P$ | 3.0 | 16 |
| ++ | 7 | — | — | Cu—10Sn—10Pb | — | — | 12 |

Remarks
* Examples.
++ Comparative Examples

In Table 1, the compositions of Comparative Example 1 and Example 1 are mutually the same except for Ag. Comparative Example 6 and Example 1 have the same composition. In Comparative Example 6, the cooling rate from sintering temperature to room temperature including the vicinity of eutectic was rapid (2000 degrees C./min). Therefore, formation of Ag—Bi eutectic was suppressed, and Ag and Bi are dissolved in the Cu matrix. Comparative Example 7 represents a representative composition of a conventional Pb-containing copper alloy.

From a comparison of Example 1 with Comparative Examples 1, 6, it turns out that the Ag—Bi eutectic improves the adhesion resistance better than the single Bi phase (Comparative Example 1) and the solute Ag, Bi (Comparative Example 6) do. Comparison of single Bi phase with Ag—Bi eutectic can be made also by comparing Example 8 with Comparative Example 2 and Example 10 with Comparative Example 3. The judgment obtained is as described above.

In order to verify adhesion resistance of the Ag—Bi eutectic phase, an object formed solely of Bi and an object formed solely of Ag—Bi eutectic alloy were prepared and subjected to the friction test mentioned above. FIG. 1 shows the relationship between time sequence and a friction coefficient.

As shown in FIG. 1, initial friction coefficient of the object formed solely of Bi changed greatly and drastically. On the other hand, friction coefficient of an object formed solely of Ag—Bi virtually did not change and was low.

Figure 2:
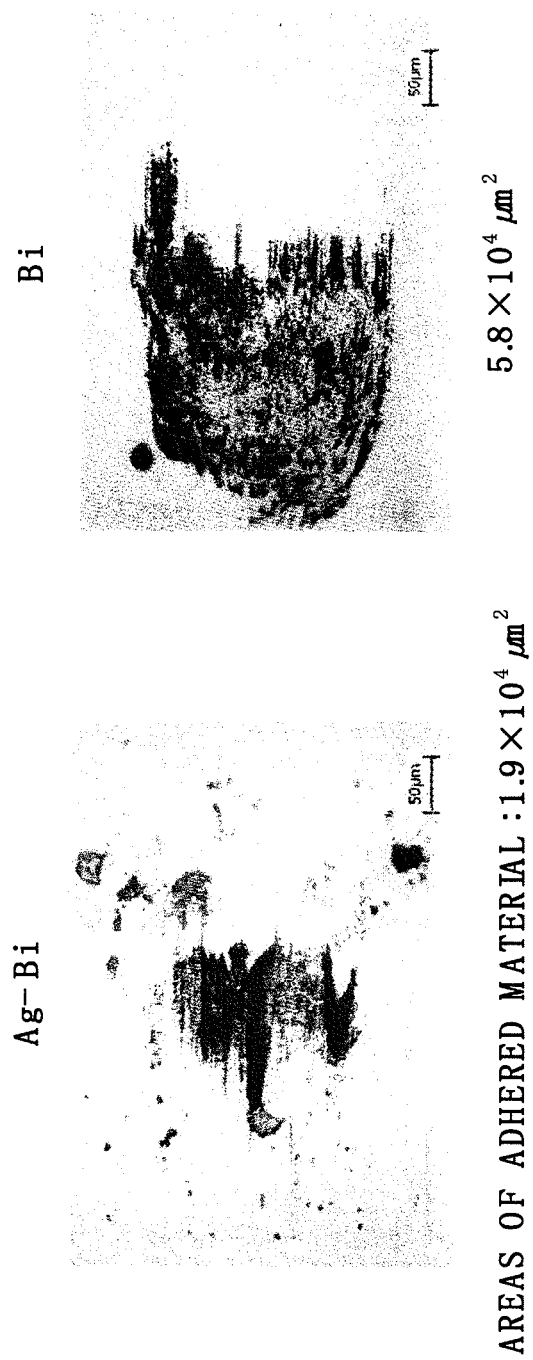
FIG. 2 A photograph showing adhesion on mating material

The object formed solely of Bi and that formed solely of Ag—Bi eutectic alloy adhere on mating material as shown in FIG. 2. FIG. 2 shows the measurement results of a test for a time total period of 3 minutes. The area of the adhered material was $1.9 \times 10^4$ $\mu m^2$ in cases of the object formed solely of Ag—Bi eutectic alloy, while area of adhered material was $5.8 \times 10^4$ $\mu m^2$ in a case of object formed solely of Bi. It turns out from the above results that the Ag—Bi eutectic is improved over the single Bi object in terms of seizure resistance.

Examples 2, 4, 8, 11 of Table 1 are the copper alloys according to the present invention, in which an Ag—Bi eutectic having improved adhesion-resistance is formed. Comparative Example 7 is a conventional Pb-containing material. These materials were subjected to a seizure resistance test in the form of a bush mentioned above. As shown in Table 2, the seizure resistance of all the Examples are superior to those of Comparative Example 7.

The copper-alloy sliding material according to the present invention is free of Pb but has improved adhesion resistance. Seizure is likely to occur, when the sliding surface is subjected to high temperature due to contact of the bearing with a mating shaft. When the copper-alloy sliding material according to the present invention is used as a bearing material, since friction coefficient at high temperature is low and stable, adhesion on a mating shaft and hence seizure can be prevented.

Figure 3:
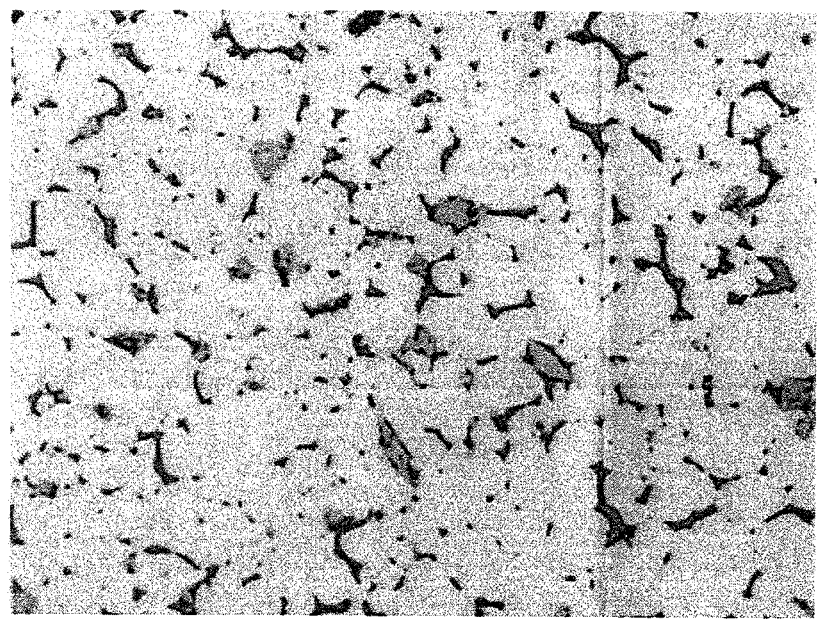
FIG. 3 A photograph showing the metal microscope structure (magnification: 200 times) of the inventive sliding material according to one Example.
Figure 4:
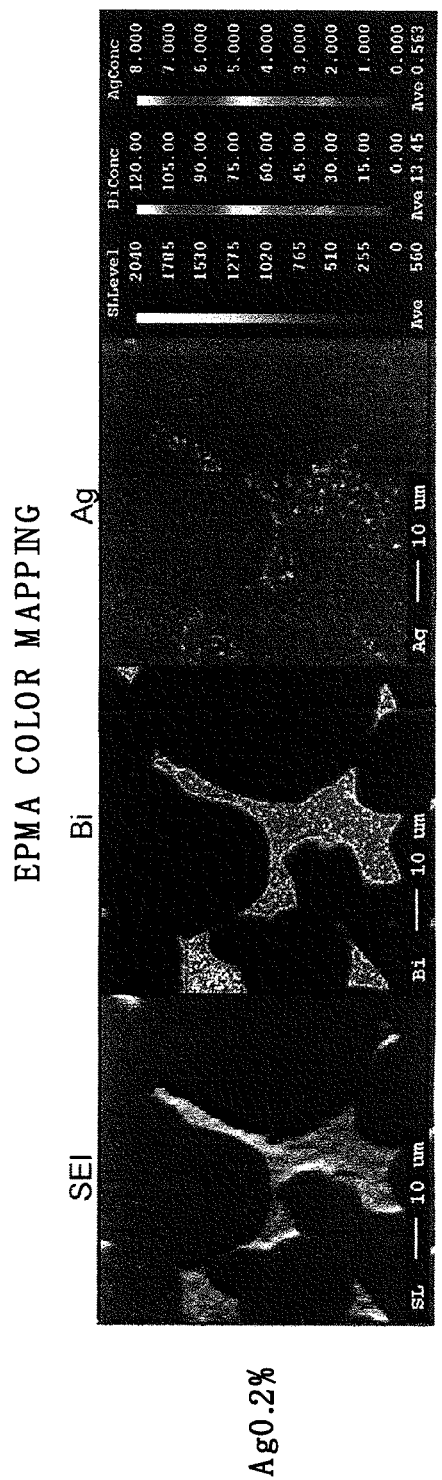
FIG. 4 An EPMA color mapping of the material of FIG. 3 is obtained. This color mapping is converted to a monotone image and is shown in FIG. 4.

Structure of sintered alloy according to Example 4 of Table 1 is shown in FIG. 3. Color mapping by EPMA (product of Nihon Denshi Co., Ltd, type (JXA8100) (accelerating voltage-20 kV) is shown in FIG. 4. As shown in FIG. 3, the Cu matrix includes copper particles bonded by sintering, and the Ag—Bi eutectic, which is a secondary phase, elongates along the grain boundaries of the Cu matrix, and assumes white. Fine Ag is not distinct. The Ag phase is distinguished in FIG. 4 by EPMA. Since high concentration regions of Bi and Ag are coincident with each other, it turns out that they crystallize as an eutectic. Neither Bi nor Ag is detected in the Cu matrix. A gray polygonal material in FIG. 3 is $Fe_3P$.

The same structure as shown in FIGS. 3 and 4 was observed for the other Examples of Table 1.

INDUSTRIAL APPLICABILITY

As is described hereinabove, the Pb-free sintered copper alloy according to the present invention has improved initial friction properties, and, therefore, a plain bearing can be preferably used for a bush of an automatic transmission.

The invention claimed is:

1. A method for producing a Pb-free sintered copper-alloy sliding material, comprising:
   preparing a copper alloy powder consisting of, by mass percentage, 1.0 to 15.0% of Sn, 2 to 10% of Bi and 0.05 to 5.0% of Ag, with the balance being Cu and unavoidable impurities;
   heating said copper alloy powder to a temperature in a range of 700 to 900 degrees C.; and,
   cooling said copper alloy, in which said Sn, Bi and Ag are dissolved in solid copper alloy, under a condition that said Ag and Bi form an Ag—Bi eutectic, and neither Ag nor Bi are essentially dissolved in a Cu matrix, and Ag and Bi are not precipitated in a morphology except for said Ag—Bi eutectic.

2. The method according to claim 1, wherein a cooling speed at an Ag—Bi eutectic temperature is 200 degrees per minute.

3. A method for producing a Pb-free sintered copper-alloy sliding material comprising:
   preparing a copper alloy powder consisting of, by mass percentage, 1.0 to 15.0% of Sn, 2 to 10% of Bi, 0.05 to 5.0% of Ag, at least one of 0.1 to 5.0% of Ni, 0.02 to 0.2% P, and 0.5 to 30.0% of Zn, with the balance being Cu and unavoidable impurities;
   heating said copper alloy powder to a temperature in a range of 700 to 900 degrees C.; and,
   cooling said copper alloy, in which said Sn, Bi and Ag are dissolved in solid copper alloy, under a condition that said Ag and Bi form an Ag—Bi eutectic, neither Ag nor Bi are essentially dissolved in a Cu matrix, and Ag and Bi are not precipitated in a morphology except for said Ag—Bi eutectic.

4. The method according to claim 3, wherein a cooling speed at an Ag—Bi eutectic temperature is 200 degrees per minute.

5. The method for producing a Pb-free sintered copper-alloy sliding material according to claim 1, further comprising the steps of preparing an at least one hard-particle powder selected from the group consisting of $Fe_3P$, $Fe_2P$, FeB, NiB and AlN, having an average particle diameter of 1.5 to 70 µm, in an amount of 1.0 to 10.0% by mass relative to total of said copper alloy powder and hard-particle powder; and mixing said copper alloy powder and said hard particle powder prior to heating to a temperature in a range of 700 to 900 degrees C.

6. The method for producing a Pb-free sintered copper-alloy sliding material according to claim 2, further comprising the steps of preparing an at least one hard-particle powder selected from the group consisting of $Fe_3P$, $Fe_2P$, FeB, NiB and AlN, having an average particle diameter of 1.5 to 70 µm, in an amount of 1.0 to 10.0% by mass relative to total of said copper alloy powder and hard-particle powder; and mixing said copper alloy powder and said hard particle powder prior to heating to a temperature in a range of 700 to 900 degrees C.

7. The method according to claim 1, wherein the heating is carried out on a backing metal.

8. The method according to claim 5, wherein the heating is carried out on a backing metal.

9. The method according to claim 6, wherein the heating is carried out on a backing metal.

* * * * *